United States Patent
Lee et al.

(10) Patent No.: US 9,240,182 B2
(45) Date of Patent: Jan. 19, 2016

(54) METHOD AND APPARATUS FOR ADJUSTING DETECTION THRESHOLD FOR ACTIVATING VOICE ASSISTANT FUNCTION

(71) Applicant: QUALCOMM Incorporated, San Diego, CA (US)

(72) Inventors: Minsub Lee, Seoul (KR); Taesu Kim, Seongnam (KR); Kyu Woong Hwang, Taejon (KR); Minho Jin, Gyeonggi-do (KR)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 14/029,131

(22) Filed: Sep. 17, 2013

(65) Prior Publication Data

US 2015/0081296 A1    Mar. 19, 2015

(51) Int. Cl.
  *G10L 15/20* (2006.01)
  *G10L 15/22* (2006.01)
  *G10L 25/48* (2013.01)
  *G06F 3/16* (2006.01)

(52) U.S. Cl.
  CPC ............... *G10L 15/20* (2013.01); *G06F 3/167* (2013.01); *G10L 15/22* (2013.01); *G10L 25/48* (2013.01); *G10L 2015/228* (2013.01)

(58) Field of Classification Search
  None
  See application file for complete search history.

(56) References Cited

U.S. PATENT DOCUMENTS

| | | | |
|---|---|---|---|
| 6,138,094 A | 10/2000 | Miet et al. | |
| 8,270,954 B1 | 9/2012 | Breau et al. | |
| 8,417,518 B2 | 4/2013 | Iwasawa | |
| 2007/0263805 A1 | 11/2007 | McDonald | |
| 2008/0248797 A1 | 10/2008 | Freeman et al. | |
| 2008/0300025 A1* | 12/2008 | Song et al. | 455/569.1 |
| 2009/0313008 A1* | 12/2009 | Okada et al. | 704/10 |
| 2010/0198093 A1 | 8/2010 | Katayama et al. | |
| 2012/0034904 A1* | 2/2012 | Lebeau et al. | 455/414.1 |
| 2012/0035931 A1 | 2/2012 | Lebeau et al. | |
| 2012/0264091 A1* | 10/2012 | Huber et al. | 434/185 |
| 2012/0265528 A1 | 10/2012 | Gruber et al. | |
| 2013/0339019 A1* | 12/2013 | Giancarlo et al. | 704/251 |

OTHER PUBLICATIONS

International Search Report and Written Opinion—PCT/US2014/054540—ISA/EPO—Dec. 8, 2014.

Miller D, "OK Google . . . Now We're Talking!", opus research, Aug. 2, 2013, 2 Pages, Retrieved from the Internet: URL:http://opusresearch.net/wordpress/2013/08/02/ok-google-now-were-talking/ [retrieved on Jul. 21, 2015].

* cited by examiner

*Primary Examiner* — Jeremiah Bryar
(74) *Attorney, Agent, or Firm* — Toler Law Group, PC

(57) ABSTRACT

A method for activating a voice assistant function in a mobile device is disclosed. The method includes receiving an input sound stream by a sound sensor and determining a context of the mobile device. The method may determine the context based on the input sound stream. For determining the context, the method may also obtain data indicative of the context of the mobile device from at least one of an acceleration sensor, a location sensor, an illumination sensor, a proximity sensor, a clock unit, and a calendar unit in the mobile device. In this method, a threshold for activating the voice assistant function is adjusted based on the context. The method detects a target keyword from the input sound stream based on the adjusted threshold. If the target keyword is detected, the method activates the voice assistant function.

50 Claims, 13 Drawing Sheets

METHOD AND APPARATUS FOR ADJUSTING DETECTION THRESHOLD FOR ACTIVATING VOICE ASSISTANT FUNCTION

TECHNICAL FIELD

The present disclosure relates generally to a method for activating a voice assistant function in a mobile device. More specifically, the present disclosure relates to adjusting a threshold for detecting a target keyword in the mobile device.

BACKGROUND

In recent years, the use of mobile devices such as smartphones and tablet computers has become widespread. Such mobile devices generally allow voice and data communications over wireless networks. Typically, these devices include additional features or applications, which provide a variety of functions designed to enhance user convenience.

Among such applications or features, a voice assistant application enables a mobile device to receive a voice command from a user for operating various functions or other applications in response to the voice command. For example, a voice assistant application may allow the user to speak a voice command to call a desired phone number, play an audio file, take a picture, search the Internet, or obtain weather information, without physically operating the mobile device by hand. Accordingly, the user may choose to use a voice command to control various operations of the mobile device in a variety of situations where the user may not wish to or cannot physically operate the mobile device.

Conventional voice assistant applications are often activated in response to a physical input by a user (e.g., by hand). However, since one of the purposes in using a voice assistant application may be to operate a mobile device without a physical input, the user may find it inconvenient or difficult to physically activate the voice assistant application. Thus, some mobile devices allow a user to activate the voice assistant application by speaking a voice command.

However, such mobile devices are often activated erroneously in response to various input sounds captured by the devices or fail to be activated in response to a proper voice command. For example, a mobile device may erroneously recognize another person's utterance as a proper voice command and activate a voice assistant application. On the other hand, when a mobile device is in a loud environment, the mobile device may not recognize a proper voice command due to the background noise and thus fail to activate the voice assistant application.

SUMMARY

The present disclosure provides methods and devices for activating a voice assistant function by detecting a target keyword in an input sound stream based on a threshold that may be adjusted according to contexts of the devices.

According to one aspect of the present disclosure, a method for activating a voice assistant function in a mobile device is disclosed. The method includes receiving an input sound stream by a sound sensor and determining a context of the mobile device. In this method, a threshold for activating the voice assistant function is adjusted based on the context. The method detects a target keyword from the input sound stream based on the adjusted threshold. If the target keyword is detected, the method activates the voice assistant function. This disclosure also describes apparatus, a device, a combination of means, and a computer-readable medium relating to this method.

According to another aspect of the present disclosure, a mobile device for activating a voice assistant function includes a sound sensor, a threshold adjustment unit, and a voice activation unit. The sound sensor is configured to receive an input sound stream. The threshold adjustment unit is configured to adjust a threshold for activating the voice assistant function by determining a context of the mobile device. The voice activation unit is configured to activate the voice assistant function if a target keyword is detected from the input sound stream based on the adjusted threshold.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
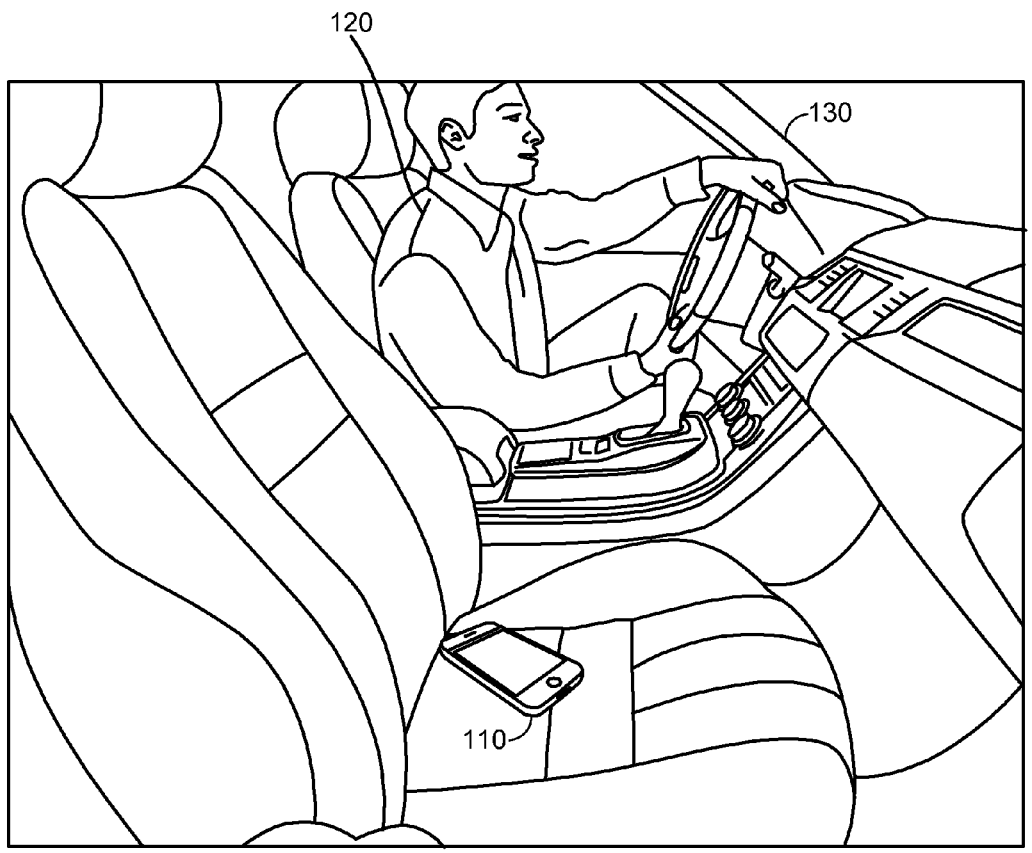
FIG. 1 illustrates a mobile device configured to adjust a detection threshold for activating a voice assistant function when a context of the mobile device is determined to be in a vehicle, according to one embodiment of the present disclosure.

FIG. 1 illustrates a mobile device 110 configured to adjust a detection threshold for activating a voice assistant function when a context of the mobile device 110 is determined to be in a vehicle 130, according to one embodiment of the present disclosure. In this illustrated embodiment, a user 120 of the mobile device 110 is driving the vehicle 130 while the mobile device 110 is placed on a passenger seat of the vehicle 130. The mobile device 110 of FIG. 1 may be a smartphone equipped with a speech recognition function for recognizing speech of a user in an input sound.

When the voice assistant function in the mobile device 110 is activated, the mobile device 110 can respond to various verbal requests, instructions, commands, and the like from the user 120 using the speech recognition function. For example, the user 120 may speak an instruction such as "CALL SUSAN" when the voice assistant function has been activated. In response, the mobile device 110 recognizes the instruction and calls Susan using a phone number associated with the recognized name. The voice assistant function in the mobile device 110 may be activated in response to an input via a button or a touch screen of the mobile device 110.

In some embodiments, the mobile device 110 stores a predetermined target keyword for activating the voice assistant function when the target keyword is detected in an input sound from the user 120. As used herein, the term "target keyword" refers to any digital or analog representation of one or more words or sound that can be used to activate a function or an application in the mobile device 110. For instance, a predetermined keyword such as "HEY VOICE ASSISTANT" or "START VOICE ASSISTANT" may be stored in the mobile device 110 as a target keyword for activating the voice assistant function. When an input sound is received from the user 120, the mobile device 110 may detect the target keyword in the input sound by performing a speech recognition function on the received input sound.

The mobile device 110 may be configured to detect a target keyword based on a detection threshold to ensure a desired confidence level. In one embodiment, the mobile device 110 calculates a degree of similarity (or a keyword matching score) between an input sound and the target keyword and compares the degree of similarity with the detection threshold. In calculating the degree of similarity, a preset sound model for the target keyword may be used. If the degree of similarity between the input sound and the target keyword (or the sound model) exceeds the detection threshold, the mobile device 110 detects the target keyword in the input sound and activates the voice assistant function. On the other hand, if the degree of similarity does not exceed the detection threshold, the mobile device 110 determines that the target keyword is not detected in the input sound.

The detection threshold affects accuracy in detecting a target keyword in an input sound. For example, if the detection threshold is too high, the mobile device 110 may not detect a target keyword from an input sound that includes the target keyword. In such a case, the mobile device 110 may "miss" the target keyword in the input sound, and lead to an increased miss rate for the target keyword. On the other hand, if the detection threshold is too low, the mobile device 110 may erroneously detect a target keyword in an input sound that does not include the target keyword. In such a case, the mobile device may erroneously activate the voice assistant function (i.e., "false activation"), and cause an increased false activation rate for the voice assistant function.

In some embodiments, the detection threshold is set initially to a predetermined value (e.g., a default value) and then adjusted based on a change in a context of the mobile device 110. With reference to FIG. 1, the mobile device 110 is configured to determine a context based on context data from various sensors such as a sound sensor, a global positioning system (GPS), and an accelerometer. For example, the sound sensor of the mobile device 110 may capture environmental traffic noises, including an engine sound and road noise, as an input sound. In addition, the GPS and the accelerometer may monitor the location, speed, and/or acceleration of the mobile device 110. Based on the context data from the sensors, the mobile device 110 may identify the context of the mobile device 110 as being in a vehicle.

When the context of the mobile device 110 is determined to be in a vehicle, it may be assumed that the user 120 of the mobile device 110 in FIG. 1 is more likely to use the voice assistant function than physically operate the mobile device 110 by hand. Accordingly, the mobile device 110 may adjust the detection threshold to a value lower than a default detection threshold which is predetermined for normal or unidentified contexts. The reduced detection threshold increases the likelihood of detecting the target keyword (e.g., a decreased miss rate) to reduce the likelihood of the user having to operate the mobile device 110 by hand.

Figure 2:
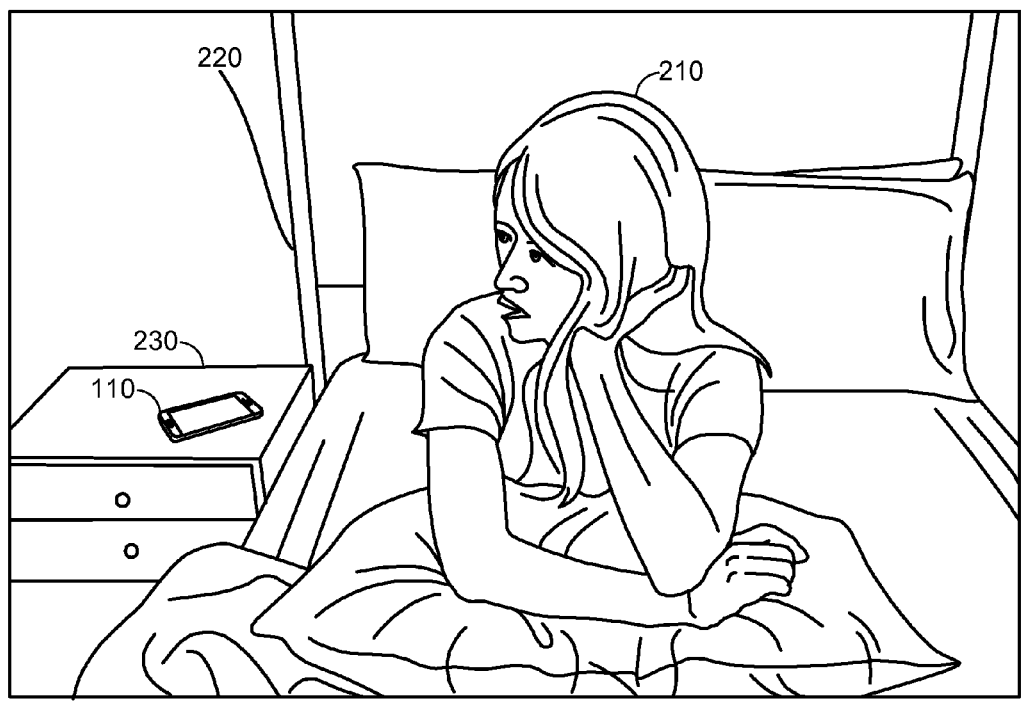
FIG. 2 illustrates a mobile device configured to adjust a detection threshold for activating a voice assistant function if a context of the mobile device is determined to be in the morning when a user is likely to be awake, according to one embodiment of the present disclosure.

The likelihood of using the voice assistant function may also be assumed to be high in some other contexts. FIG. 2 illustrates the mobile device 110 configured to adjust the detection threshold for activating the voice assistant function if a context of the mobile device 110 is determined to be in the morning when a user 210 is likely to be awake, according to one embodiment of the present disclosure. The mobile device 110 is placed near the user 210, for example, put on a table 230 near a bed 220 as illustrated in FIG. 2.

In this example, the user 210 has woken up in the morning but is still sitting on the bed 220. In this case, an illumination sensor in the mobile device 110 may generate context data indicating a bright environment of the mobile device 110. Further, a clock unit in the mobile device 110 may also provide a current time (e.g., 7:00 AM) as context data. In some embodiments, the current time can be compared with a time set in the mobile device 110 by the user 210 that indicates when he or she typically wakes up. In addition, a sound sensor in the mobile device 110 also captures quiet environmental sound having small intensity as an input sound, which is provided as context data. Further, a GPS unit in the mobile device 110 may determine that the mobile device 110 is at home of the user 210, which is also used as context data.

Based on the context data as generated above, the mobile device 110 may determine the context of the mobile device 110 to be in the morning when the user 210 is likely to be awake. In this case, it may be assumed that the user 210 of the mobile device 110 is more likely to use the voice assistant function than physically operate the mobile device 110 by hand. For example, the user 210 may wish to check the weather or schedule of the day using the voice assistant function in the mobile device 110 while sitting on the bed 220. Accordingly, the mobile device 110 may adjust the detection threshold to a value lower than the default detection threshold, leading to increasing the likelihood of detecting the target keyword (e.g., a decreased miss rate).

Figure 3:
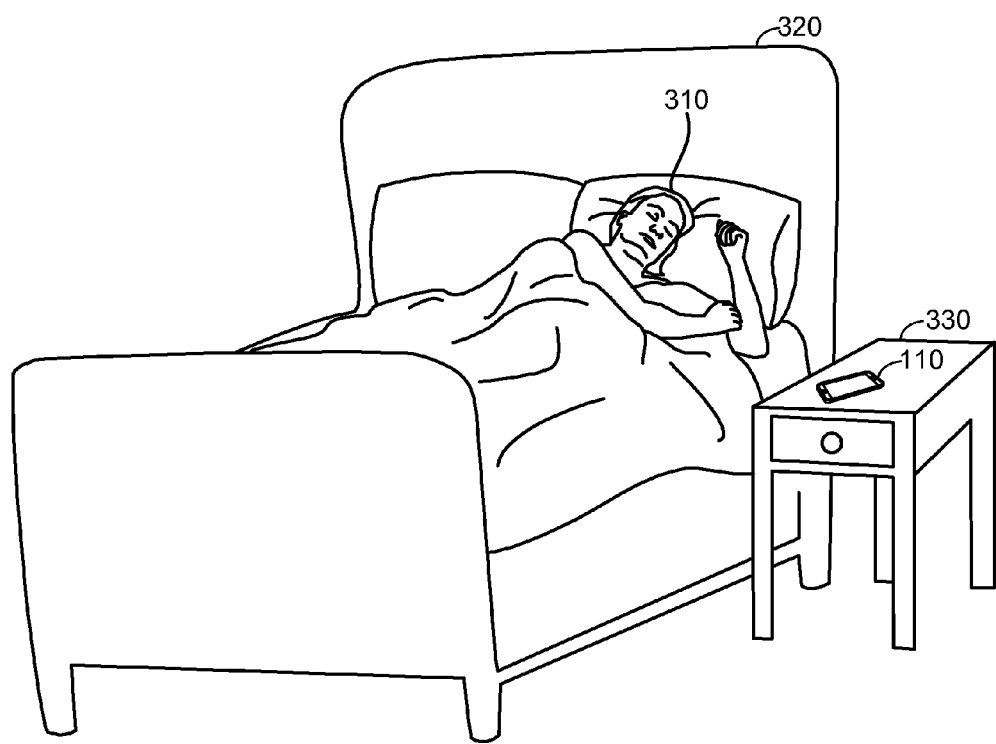
FIG. 3 illustrates a mobile device configured to adjust a detection threshold for activating a voice assistant function if a context of the mobile device is determined to be at night when a user is likely to be asleep, according to one embodiment of the present disclosure.

In contrast, the likelihood of using the voice assistant function may be assumed to be low. FIG. 3 illustrates the mobile device 110 configured to adjust the detection threshold for activating the voice assistant function if a context of the mobile device 110 is determined to be at night when a user 310 is likely to be asleep (i.e., a sleeping context), according to one embodiment of the present disclosure. In FIG. 3, the mobile device 110 is placed near the user 310, for example, put on a table 330 near a bed 320.

In the example of FIG. 3, the user 310 is sleeping in the bed 320 at night. In this case, an illumination sensor in the mobile device 110 may detect a dark environment of the mobile device 110 and provide context data indicating the dark environment. Further, a clock unit in the mobile device 110 may also provide a current time (e.g., 3:00 AM) as context data. In some embodiments, the current time can be compared with a time range set in the mobile device 110 by the user 310, which indicates when he or she typically goes to sleep and wakes up. In addition, a sound sensor in the mobile device 110 may also capture quiet environmental sound having small intensity as an input sound and provide it as context data. Further, the location of the mobile device 110 can be determined by a GPS unit in the mobile device 110 and used as context data (e.g., at home of the user 310).

Based on the context data as generated above, the mobile device 110 may determine the context of the mobile device 110 to be at night when the user 310 is likely to be asleep. In this case, it may be assumed that the user 310 of the mobile device 110 is less likely to use the voice assistant function than when the user 310 is awake in the daytime. Accordingly, the mobile device 110 may adjust the detection threshold to a value higher than the default detection threshold. The increased detection threshold leads to reducing the likelihood of erroneously activating the voice assistant function (e.g., a decreased false activation rate).

Figure 4:
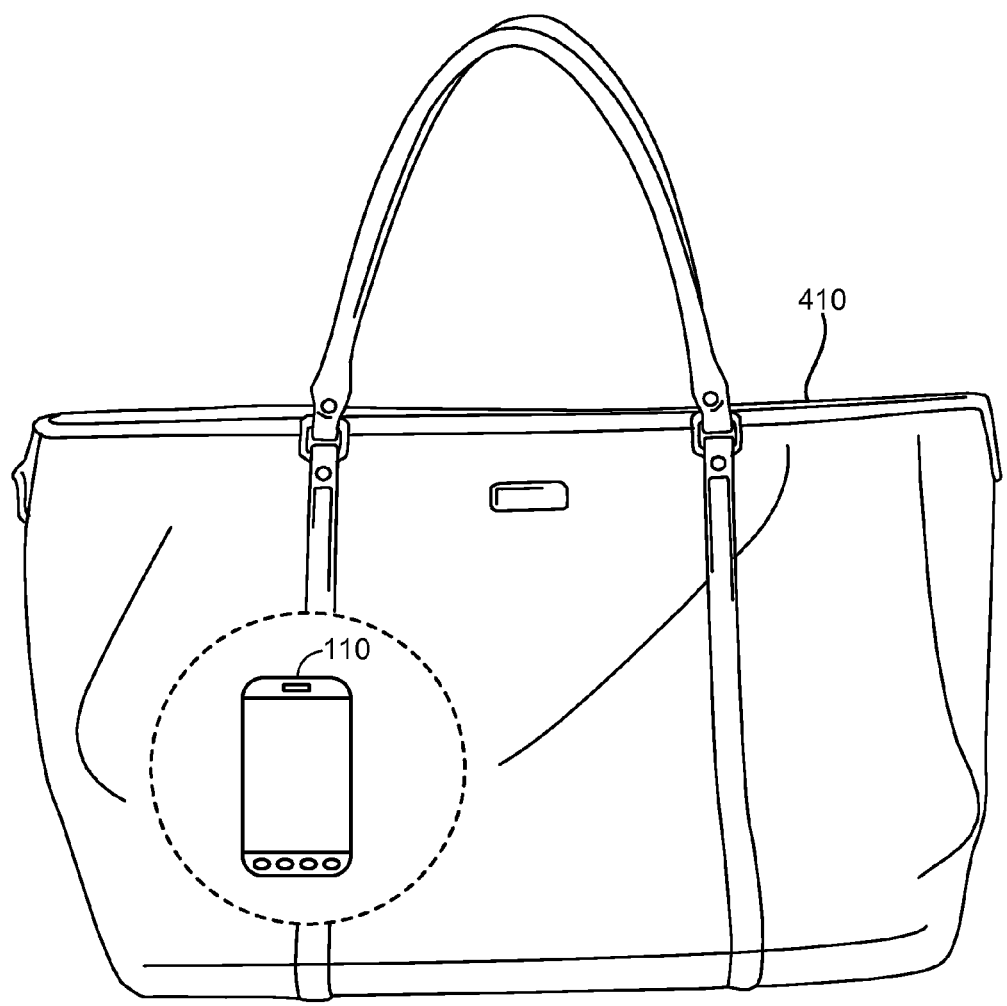
FIG. 4 illustrates a mobile device configured to adjust a detection threshold for activating a voice assistant function when a context of the mobile device is determined to be in a bag, according to one embodiment of the present disclosure.

The likelihood of using the voice assistant function may also be assumed to be low in some other contexts. FIG. 4 illustrates the mobile device 110 configured to adjust the detection threshold for activating the voice assistant function when the context of the mobile device 110 is determined to be in a bag 410, according to one embodiment of the present disclosure. In the illustrated example, although the mobile device 110 is put in the bag 410 (as indicated by a dotted circle), it may be put within any other kinds of containers such as a pocket of clothes, a pouch, and the like.

In the example of FIG. 4, various sensors are used to generate context data indicating the context of the mobile device 110. For example, an illumination sensor in the mobile device 110 may detect a dark environment of the mobile device 110 within the bag 410 and generate context data indicating the dark environment. Further, a proximity sensor in the mobile device 110, which is configured to sense objects located close to the sensor, may be used to generate context data indicating that an object exists close to the mobile device 110. In this example, the proximity sensor may detect existence of close objects, e.g., an inner surface of the bag 410. In addition, a sound sensor of the mobile device 110 may capture scarping or tapping sound as an input sound, which may be caused by friction between the mobile device 110 and the surrounding inner surface of the bag 410. The captured input sound is also used as context data in determining the context of the mobile device 110.

Based on the context data as generated above, the mobile device 110 may determine the context as being in a container such as the bag 410. In this context, it may be assumed that a user of the mobile device 110 in FIG. 4 is less likely to use the voice assistant function than when the mobile device 110 is placed out of such a container (e.g., the bag 410). Accordingly, the mobile device 110 may adjust the detection threshold to a value higher than the default detection threshold. The increased detection threshold leads to reducing the likelihood of erroneously activating the voice assistant function (e.g., a decreased false activation rate).

Figure 5:
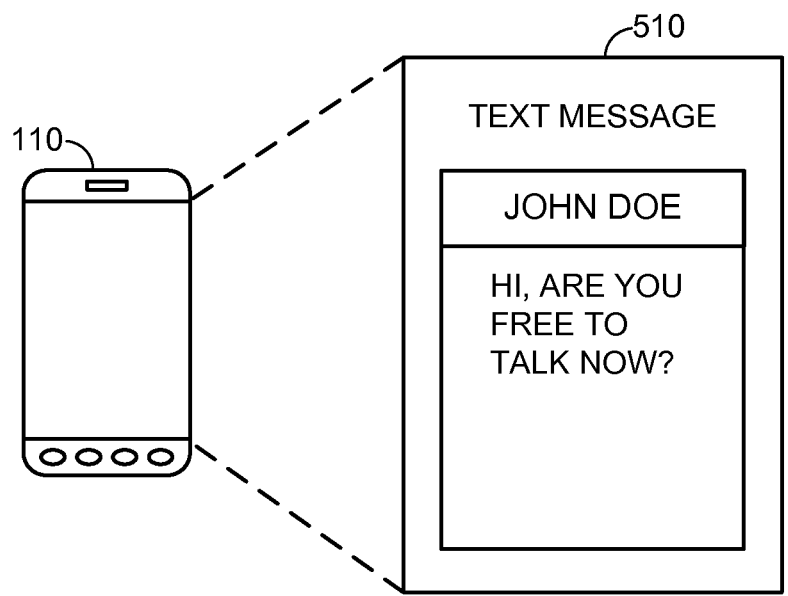
FIG. 5 illustrates a mobile device configured to adjust a detection threshold for activating a voice assistant function in a context of receiving a text message, according to one embodiment of the present disclosure.

In some embodiments, the mobile device 110 may detect a context where an operational status of the mobile device 110 changes from an idle state to an active state. FIG. 5 illustrates the mobile device 110 configured to adjust a detection threshold for activating the voice assistant function in a context of receiving a text message, according to one embodiment of the present disclosure. Initially, the mobile device 110 may be in the idle state in which an application processor may be in an inactive state to conserve power for the mobile device 110. When the mobile device 110 receives the text message from an external network during the idle state, the application processor may be activated to execute a message application and output a notification of a sender (i.e., "JOHN DOE") and the text message (i.e., "HI, ARE YOU FREE TO TALK NOW?") on a display screen 510 of the mobile device 110. The operational status of the mobile device 110 may also change from the idle state to the active state when the mobile device 110 receives an e-mail message, a multimedia message, a push notification, and the like. Further, the mobile device 110 may also change from the idle state to the active state in response to an alarm event (e.g., a timer alarm).

When the operational status of the mobile device 110 or the application processor changes from the idle state to the active state, a user of the mobile device 110 is more likely to use the voice assistant function to perform an operation. In the example of FIG. 5, the user may use the mobile device 110 to call the sender of the text message through the voice assistant function. Accordingly, the likelihood of using the voice assistant function may be assumed to be higher than when the mobile device 110 is in the idle state. Thus, when the mobile device 110 detects an operational status change from an idle state to an active state, it adjusts the detection threshold to be lower than the default detection threshold. The reduced detection threshold increases the likelihood of detecting the target keyword (e.g., a decreased miss rate).

Figure 6:
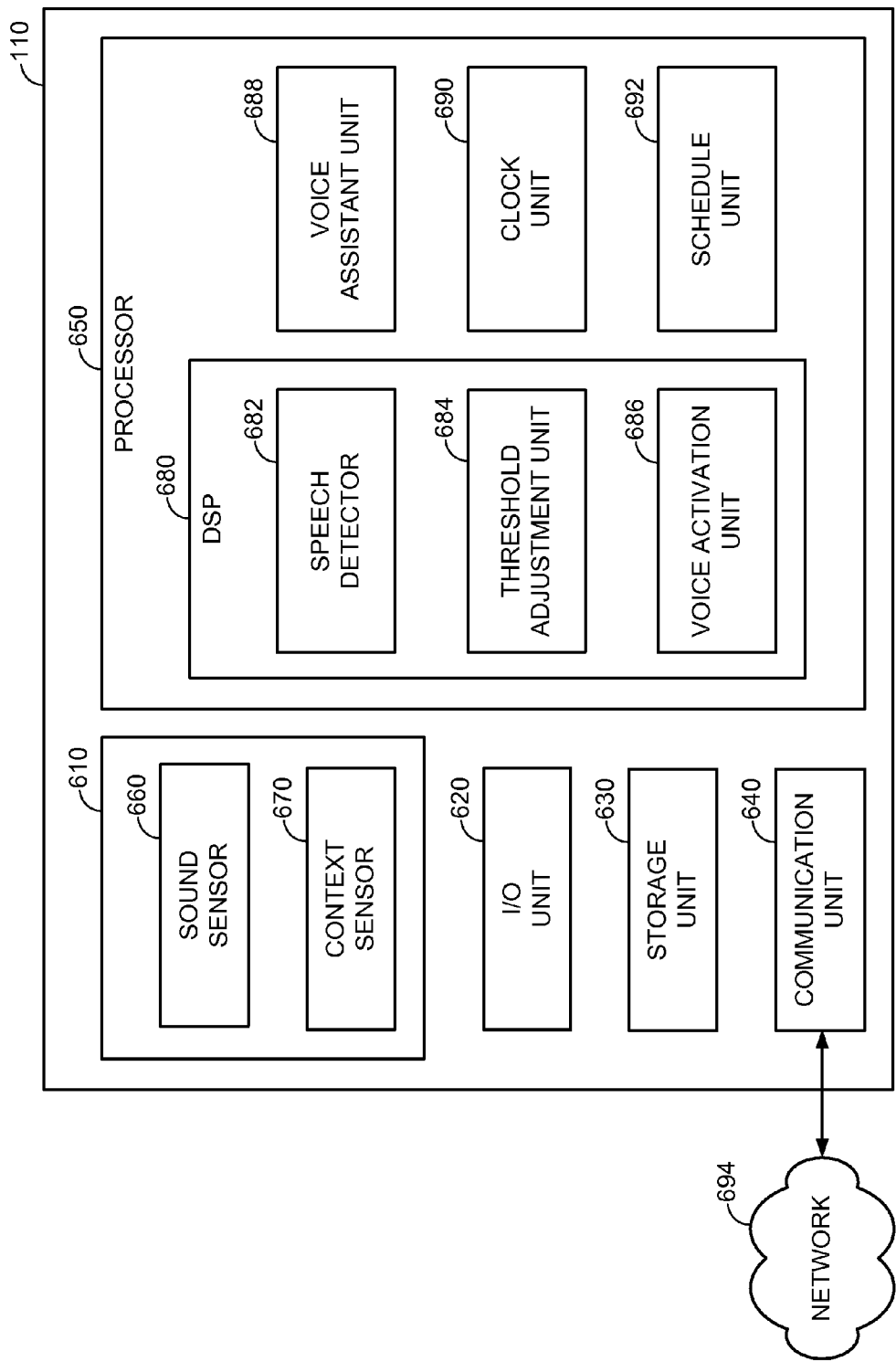
FIG. 6 illustrates a block diagram of a mobile device configured to detect a target keyword from an input sound stream by adjusting a threshold for detecting the target keyword based on a context of the mobile device, according to one embodiment of the present disclosure.

FIG. 6 illustrates a block diagram of the mobile device 110 configured to detect a target keyword from an input sound stream by adjusting a threshold for detecting the target keyword based on a context of the mobile device 110, according to one embodiment of the present disclosure. As used herein, the term "sound stream" refers to a sequence of one or more sound signals or sound data. As illustrated in FIG. 6, the mobile device 110 may include a sensor unit 610, an I/O (input/output) unit 620, a storage unit 630, a communication unit 640, and a processor 650. The mobile device 110 may be any suitable device equipped with a sound capturing and processing capability such as a cellular phone, a smartphone, a laptop computer, a tablet personal computer, a gaming device, a multimedia player, etc.

The processor 650 may include a digital signal processor (DSP) 680, a voice assistant unit 688, a clock unit 690, and a schedule unit 692, and may be an application processor or a central processing unit (CPU) for managing and operating the mobile device 110. The clock unit 690 implements a clock function, a timer function, and the like. For example, the clock unit 690 may output a current time to a user of the mobile device 110 or notify the user when a set time is reached (e.g., a timer alarm) via a display unit and/or a speaker unit of the I/O unit 620. In addition, the schedule unit 692 stores and manages schedules (e.g., appointments, events, etc.) which are input by the user. The schedule unit 692 may keep track of the times of the stored schedules and provide associated notifications to the user via the I/O unit 620.

The DSP 680 may include a speech detector 682, a threshold adjustment unit 684, and a voice activation unit 686. In one embodiment, the DSP 680 is a low power processor for reducing power consumption in processing a sound stream. In this configuration, the threshold adjustment unit 684 is configured to adjust the detection threshold based on the context of the mobile device 110. The voice activation unit 686 is configured to activate the voice assistant unit 688 when the target keyword is detected in the sound stream based on the adjusted detection threshold.

The sensor unit 610 may include a sound sensor 660 and a context sensor 670. The sound sensor 660 is configured to receive and provide the input sound stream to the speech detector 682 and the threshold adjustment unit 684 in the DSP 680. In some embodiments, the sound sensor 660 activates the speech detector 682 and the threshold adjustment unit 684 in the DSP 680 when the received input sound stream is greater in intensity than a threshold sound intensity. Upon activation, the input sound stream is also provided from the sound sensor 660 to the speech detector 682 and the threshold adjustment unit 684.

The context sensor 670 in the sensor unit 610 may include a variety of sensors for generating sensor data indicative of the context of the mobile device 110. The sensor data are then provided to the threshold adjustment unit 684. In one embodiment, the context sensor 670 may also activate the threshold adjustment unit 684 before the sensor data are provided. The sound sensor 660 and the context sensor 670 will be described in more detail with reference to FIG. 7 below. The communication unit 640, the clock unit 690, and the schedule unit 692 may be configured to provide the threshold adjustment unit 684 with a notification indicating a change in an operational status of the processor 650 from an idle state to an active state, as will be described in more detail with reference to FIG. 8 below.

The threshold adjustment unit 684 is configured to determine a context of the mobile device 110 based on the received input sound stream, the sensor data, and/or one or more notifications, which may be collectively referred to as context data. After determining the context of the mobile device 110, the threshold adjustment unit 684 adjusts the detection threshold according to the determined context. For example, if the context of the mobile device 110 indicates that the voice assistant unit 688 is likely to be used (e.g., in the contexts as described above with reference to FIGS. 1, 2, and 5), the threshold adjustment unit 684 adjusts the detection threshold to be low, for example, lower than the default detection threshold. On the other hand, if the context of the mobile device 110 indicates that the voice assistant unit 688 is not likely to be used (e.g., in the contexts as described above with reference to FIGS. 3 and 4), the threshold adjustment unit 684 adjusts the detection threshold to be high, for example, higher than the default detection threshold.

In some embodiments, detection threshold values may be predetermined for different contexts and stored in the storage unit 630 of the mobile device 110. For example, the contexts and the associated detection threshold values may be stored as a lookup table or a database structure. In the case of the lookup table, the threshold adjustment unit 684 may access the table using a determined context as an index to obtain the associated detection threshold value. The threshold adjustment unit 684 then provides the obtained detection threshold value as the adjusted detection threshold to the voice activation unit 686. The storage unit 630 in the mobile device 110 may be implemented using any suitable storage or memory devices such as a RAM (Random Access Memory), a ROM (Read Only Memory), an EEPROM (Electrically Erasable Programmable Read Only Memory), a flash memory, or an SSD (Solid State Drive).

For use in detecting the target keyword, the storage unit 630 may also store the target keyword. In one embodiment, the target keyword may be divided into a plurality of basic sound units such as phones, phonemes, or subunits thereof, and a plurality of portions representing the target keyword may be generated based on the basic sound units. Each portion of the target keyword is then associated with a state under a Markov chain model such as a hidden Markov model (HMM), a semi-Markov model (SMM), or a combination thereof. In this case, the storage unit 630 may store state information on a plurality of states associated with the plurality of portions of the target keyword, which includes transition information from each of the states to a next state including itself.

The speech detector 682 in the DSP 680, when activated, receives the input sound stream from the sound sensor 660. In one embodiment, the speech detector 682 extracts a plurality of sound features from the received input sound stream and determines whether the extracted sound features indicate sound of interest such as human speech by using any suitable sound classification method such as a Gaussian mixture model (GMM) based classifier, an artificial neural network, a HMM, a graphical model, and a Support Vector Machine (SVM). If the received input sound stream is determined to be sound of interest, the speech detector 682 activates the voice activation unit 686 and the received input sound stream is provided to the voice activation unit 686. In some other embodiments, the speech detector 682 may be omitted in the DSP 680. In this case, when the received input sound stream is greater in intensity than the threshold intensity, the sound sensor 660 activates the voice activation unit 686 and provides the received input sound stream directly to the voice activation unit 686.

As described above, the voice activation unit 686 is provided with the adjusted detection threshold and the input sound stream from the threshold adjustment unit 684 and the speech detector 682. Upon receiving the adjusted detection threshold and the input sound stream, the voice activation unit 686 detects the target keyword from the input sound stream based on the detection threshold. As the input sound stream is received, the voice activation unit 686 may sequentially extract a plurality of sound features from the input sound stream. In addition, the voice activation unit 686 may process each of the plurality of extracted sound features, and obtain the state information including the plurality of states and transition information for the target keyword from the storage unit 630. For each processed sound feature, an observation score may be determined for each of the states by using any suitable probability model such as a GMM, a neural network, and an SVM.

From the transition information, the voice activation unit 686 may obtain transition scores from each of the states to a next state in a plurality of state sequences that are possible for the target keyword. After determining the observation scores and obtaining the transition scores, the voice activation unit 686 determines scores for the possible state sequences. In one embodiment, the greatest score among the determined scores may be used as a keyword score for the processed sound feature. If the keyword score for the processed sound feature is greater than the detection threshold (which may also be referred to as a threshold keyword score), the voice activation unit 686 detects the input sound stream as the target keyword. Upon detecting the target keyword, the voice activation unit 686 generates and transmits an activation signal to turn on the voice assistant unit 688, which is associated with the target keyword.

The voice assistant unit 688 is activated in response to the activation signal from the voice activation unit 686. Once activated, the voice assistant unit 688 may output a message such as "MAY I HELP YOU?" on the display unit and/or through the speaker unit of the I/O unit 620. In response, a user may speak voice commands to activate various associated functions of the mobile device 110. For example, when a voice command for Internet search is received, the voice assistant unit 688 may recognize the voice command as a search command and perform a web search via the communication unit 640 through an external network 694. Although the illustrated embodiment activates the voice assistant unit 688 in response to detecting the target keyword, it may also activate any other applications or functions in response to detecting an associated target keyword.

Figure 7:
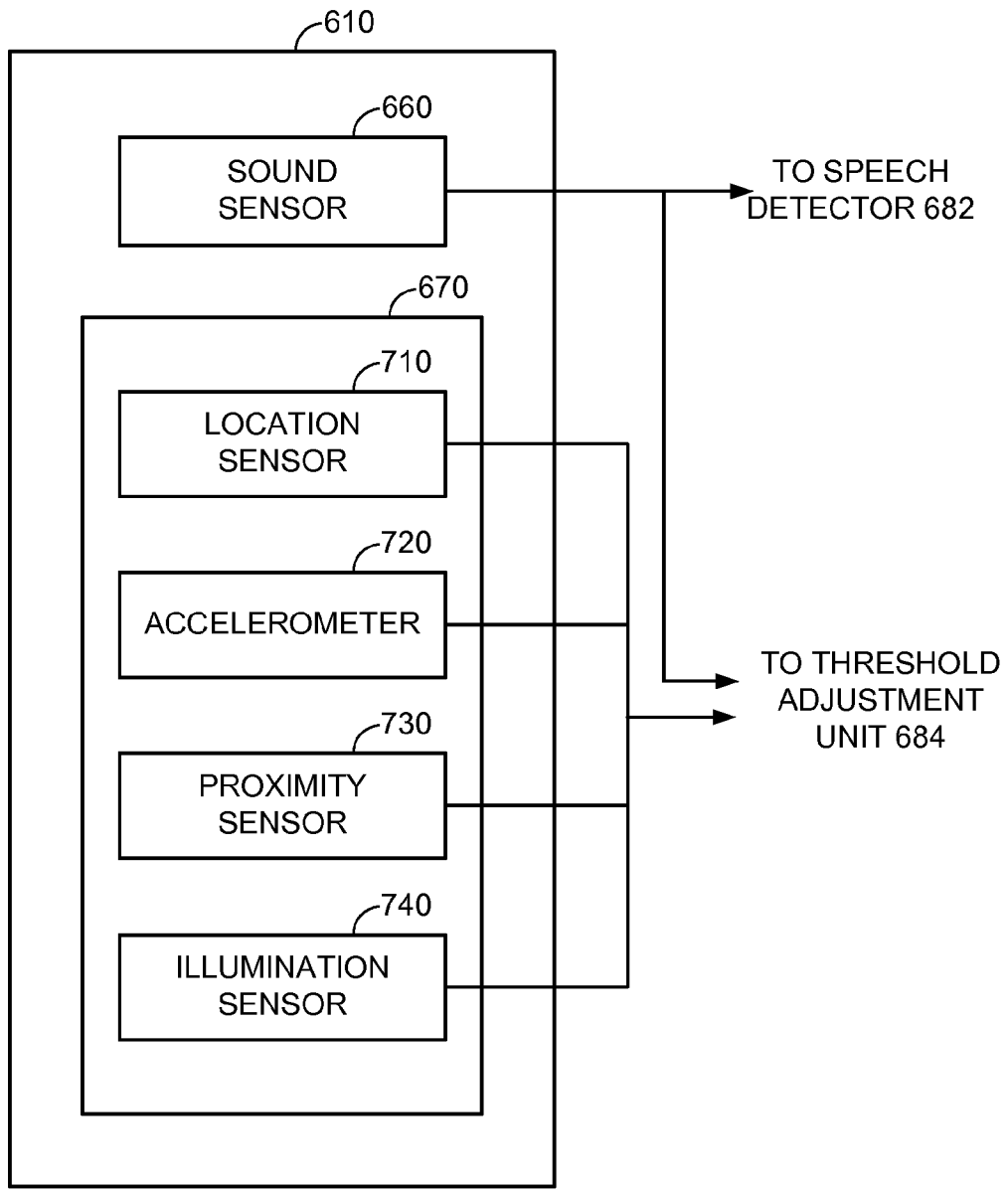
FIG. 7 illustrates a block diagram of a sensor unit in a mobile device configured to output a sound stream and sensor data for use in determining a context of the mobile device, according to one embodiment of the present disclosure.

FIG. 7 illustrates a more detailed block diagram of the sensor unit 610 configured to output a sound stream and sensor data for use in determining a context of the mobile device 110, according to one embodiment of the present disclosure. The sound sensor 660 receives an input sound stream, which is then provided to the speech detector 682 in the DSP 680. The received input sound stream is also provided to the threshold adjustment unit 684 in the DSP 680 as context data. The sound sensor 660 may include one or more microphones or any other types of sound sensors that can be used to receive, capture, sense, and/or detect an input sound stream. In addition, the sound sensor 660 may employ any suitable software and/or hardware for performing such functions. In one embodiment, the sound sensor 660 may be configured to receive the input sound stream periodically according to a duty cycle.

As illustrated in FIG. 7, the context sensor 670 may include a location sensor 710, an accelerometer 720, a proximity sensor 730, and an illumination sensor 740. The location sensor 710, which may be implemented by a GPS device, is configured to generate sensor data associated with the mobile device 110 such as a location, a direction, a speed in which the mobile device 110 is moving, or the like. The accelerometer 720 generates sensor data indicating acceleration, orientation, and the like of the mobile device 110.

The proximity sensor 730 is configured to detect an object located close to the mobile device 110, for example, using magnetic, optical, or capacitive technologies. Although one proximity sensor 730 is illustrated in FIG. 7, the context sensor 670 may include any suitable number of proximity sensors to detect objects at multiple locations of the mobile device 110 (e.g., at front, back, right, and left sides of the mobile device 110). The illumination sensor 740 is a light detector configured to sense a lighting condition, i.e., brightness, of the surroundings of the mobile device 110. The sensor data generated by the location sensor 710, the accelerometer 720, the proximity sensor 730, and the illumination sensor 740 are provided to the threshold adjustment unit 684 and used as context data in determining the context of the mobile device 110.

Figure 8:
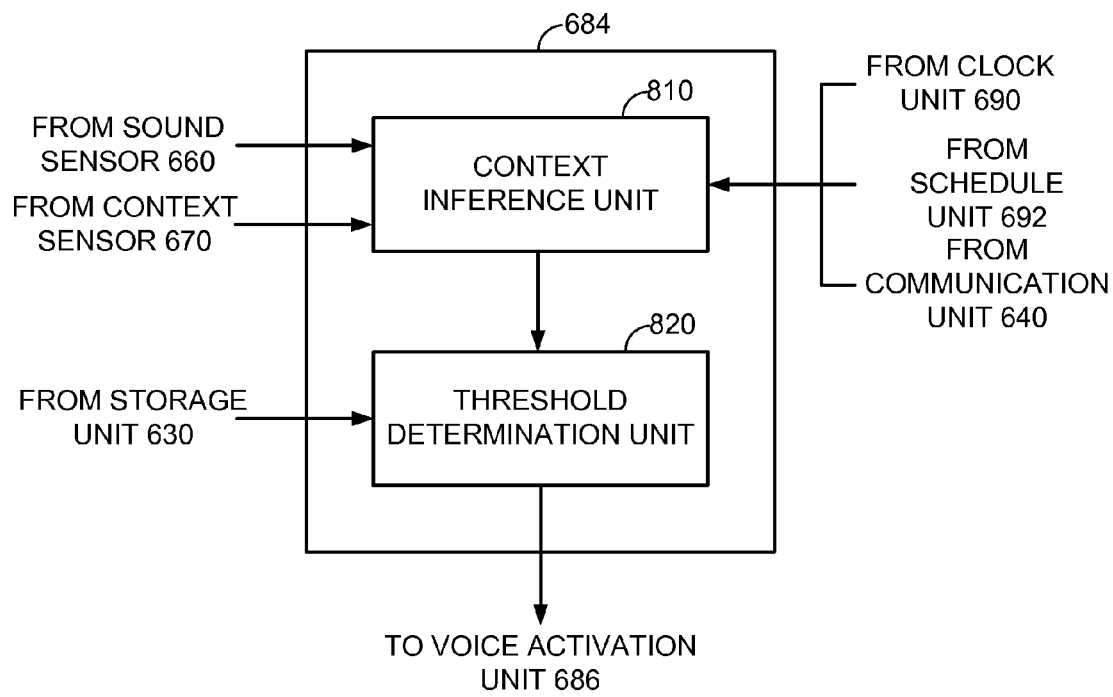
FIG. 8 illustrates a block diagram of a threshold adjustment unit in a mobile device configured to determine a detection threshold for activating a voice assistant function by inferring a context of the mobile device, according to one embodiment of the present disclosure.

FIG. 8 illustrates a block diagram of the threshold adjustment unit 684 configured to adjust a detection threshold for activating the voice assistant unit 688 by determining a context of the mobile device 110, according to one embodiment of the present disclosure. The threshold adjustment unit 684 may include a context inference unit 810 and a threshold determination unit 820. The context inference unit 810 determines the context of the mobile device 110 and the threshold determination unit 820 adjusts the detection threshold based on the context of the mobile device 110. The adjusted detection threshold is then provided to the voice activation unit 686 for use in detecting a target keyword from an input sound stream.

For determining the context of the mobile device 110, the context inference unit 810 receives the input sound stream from the sound sensor 660 and the sensor data from the context sensor 670. The context inference unit 810 is also configured to receive one or more notifications from the clock unit 690, the schedule unit 692, and the communication unit 640. Further, the clock unit 690 may provide a current time to the context inference unit 810. The input sound stream, the sensor data, the notifications, and the current time are used by the context inference unit 810 as context data in determining the context of the mobile device 110.

As described with reference to FIG. 6 above, the notifications provided to the context inference unit 810 may indicate status information of a mobile device, such as a change in an operational status of the processor 650 from an idle state to an active state. For example, the communication unit 640 may provide such a notification upon receiving an electronic message via the network 694 in FIG. 6. The electronic message may include any message or notification received through the network 694, such as an e-mail message, a text message, a multimedia message, a push notification, and the like. The clock unit 690 may be configured to alert a user at a specified time (e.g., an alarm). When the specified time is reached, the clock unit 690 activates the processor 650 and a notification of the change in the operational status of the processor 650 is provided to the context inference unit 810. In addition, the schedule unit 692 may keep track of the times of schedules or events stored in the mobile device 110 and provide a notification to the context inference unit 810 at such times or at a predetermined time before such times.

The context inference unit 810 analyzes the received context data and determines the context of the mobile device 110. In determining the context of the mobile device 110, the context inference unit 810 may infer the context from the input sound, the sensor data, the notifications, the current time, or any combination thereof. For example, the context of the mobile device 110 may be inferred to be in a vehicle based on the input sound stream and the sensor data that may include a location, speed, and/or acceleration of the mobile device 110, as described with reference to FIG. 1 above.

In some embodiments, various contexts of the mobile device 110 may be predetermined and stored according to a context database associating the contexts with context data that can be received by the context inference unit 810. Among the predetermined contexts in the context database, the context inference unit 810 may select a context that corresponds to the received context data as a current context of the mobile device 110. The context inference unit 810 then generates a context indicator for the selected context and provides the context indicator to the threshold determination unit 820.

Upon receiving the context indicator from the context inference unit 810, the threshold determination unit 820 adjusts the detection threshold based on the received context indicator. In some embodiments, values for the detection threshold may be preset for the predetermined contexts and stored in the storage unit 630. The threshold determination unit 820 may access the storage unit 630 to obtain a detection threshold value associated with the context identified by the context indicator.

In one embodiment, the detection threshold value may be set based on a likelihood of using the voice assistant unit 688 in each of the contexts. For example, if the likelihood of using the voice assistant unit 688 is high (e.g., in the contexts as described above with reference to FIGS. 1, 2, and 5), the threshold adjustment unit 684 may decrease the detection threshold (e.g., to be lower than the default detection threshold which is predetermined for normal or unidentified contexts). On the other hand, if the likelihood of using the voice assistant unit 688 is low (e.g., in the contexts as described above with reference to FIGS. 3 and 4), the threshold adjustment unit 684 may increase the detection threshold (e.g., to be higher than the default detection threshold). As a result, the detection threshold can be adjusted in association with the likelihood of using the voice assistant unit 688 in the determined context of the mobile device 110. The adjusted detection threshold is then provided to the voice activation unit 686 to be used in detecting a target keyword for activating the voice assistant unit 688.

Figure 9:
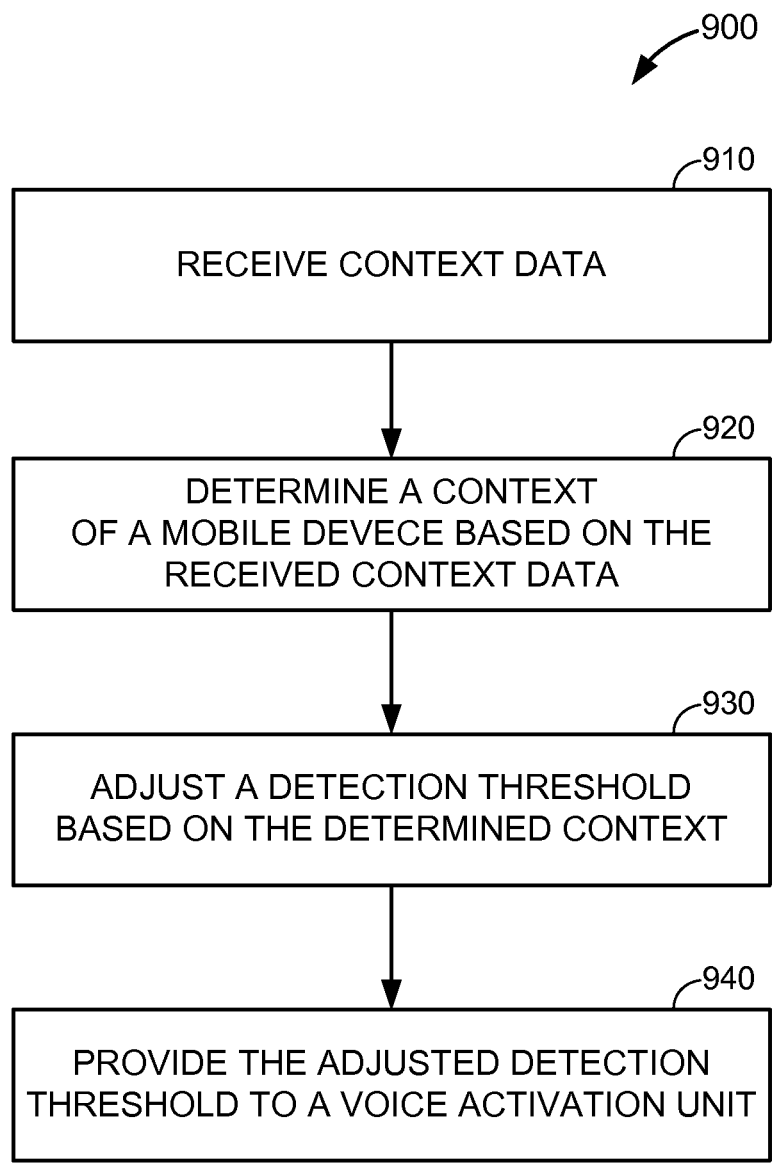
FIG. 9 is a flowchart of a method, performed in a mobile device, for determining a detection threshold for activating a voice assistant function by inferring a context of the mobile device, according to one embodiment of the present disclosure.

FIG. 9 is a flowchart of a method 900, performed in the threshold adjustment unit 684 of the mobile device 110, for determining the detection threshold for activating the voice assistant unit 688 by inferring a context of the mobile device 110, according to one embodiment of the present disclosure. The context inference unit 810 in the threshold adjustment unit 684 receives context data, at 910. Based on the received context data, the context of the mobile device 110 may be determined in the context inference unit 810, at 920. The context inference unit 810 may also generate a context indicator associated with the determined context, which is provided to the threshold determination unit 820.

The threshold determination unit 820, at 930, adjusts the detection threshold according to the context of the mobile device 110 that is identified by the context indicator received from the context inference unit 810. For adjusting the detection threshold, the threshold determination unit 820 may access the storage unit 630 to obtain a detection threshold value associated with the context of the mobile device 110. Once the detection threshold is adjusted, the threshold determination unit 820 may provide the adjusted detection threshold to the voice activation unit 686, at 940. The adjusted detection threshold is used in detecting the target keyword by the voice activation unit 686.

Figure 10:
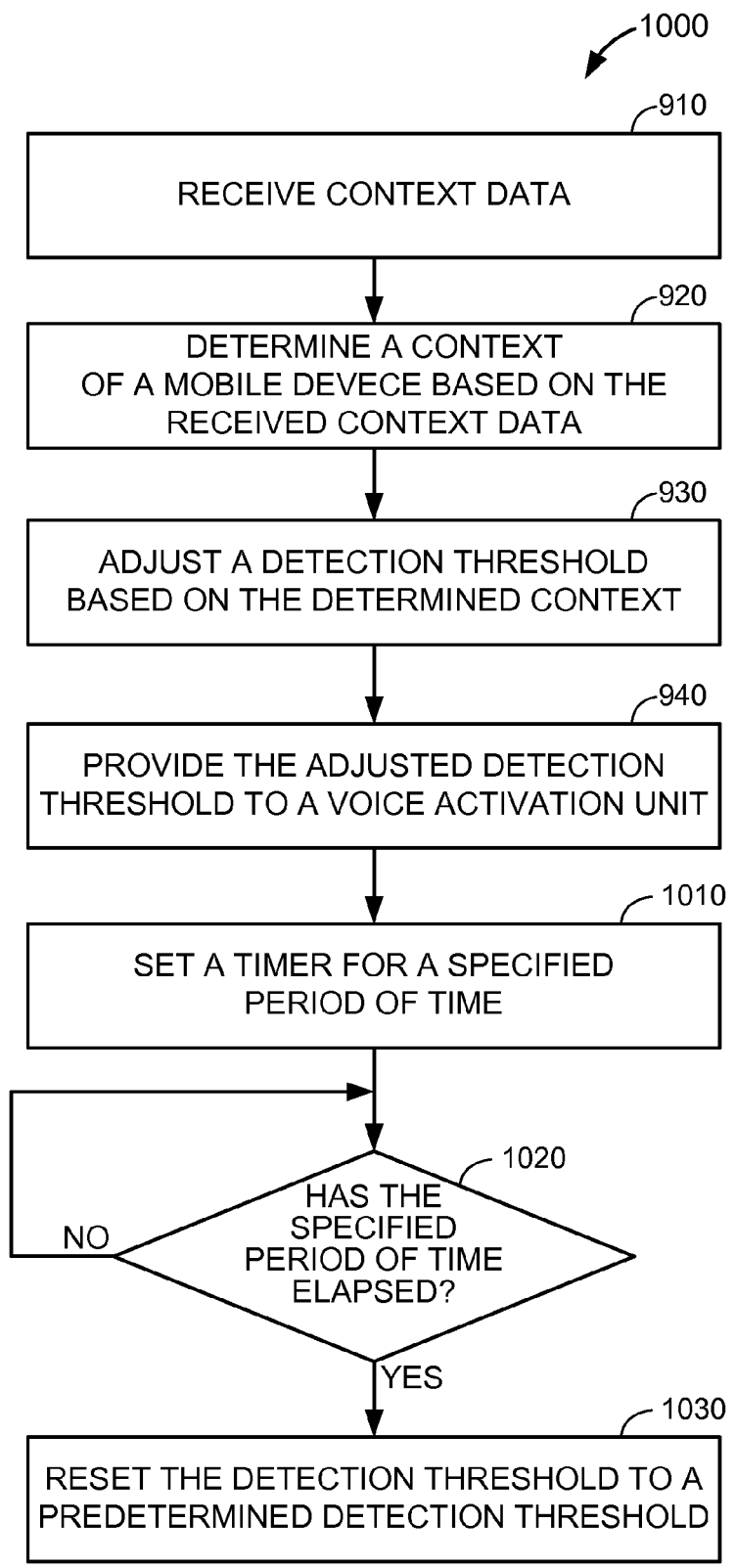
FIG. 10 is a flowchart of a method, performed in a mobile device, for generating an adjusted detection threshold and resetting the detection threshold to a predetermined detection threshold after a specified period of time, according to one embodiment of the present disclosure.

In some embodiments, the adjusted detection threshold may be reset to the default detection threshold. FIG. 10 is a flowchart of a method 1000, performed in the threshold adjustment unit 684 of the mobile device 110, for generating an adjusted detection threshold and resetting the detection threshold to a predetermined detection threshold after a specified period of time, according to one embodiment of the present disclosure. In the same manner as described with respect to FIG. 9 above, the context inference unit 810 receives context data at 910, and determines a context of the mobile device 110 at 920. The threshold determination unit 820 adjusts the detection threshold based on the context at 930, and provides the adjusted detection threshold to the voice activation unit 686 at 940.

A timer for a specified period of time may be set, at 1010, for example, by using the clock unit 690 in the processor 650. The period of time may be predetermined. The threshold adjustment unit 684 monitors the timer and determines whether the specified period of time has elapsed, at 1020. Alternatively, the clock unit 690 may detects whether the specified period of time has elapsed and notify the threshold adjustment unit 684 when the period of time has elapsed. If the specified period of time has elapsed, the threshold adjustment unit 684 may reset the detection threshold to the predetermined detection threshold (e.g., the default detection threshold), at 1030. Otherwise, if the specified period of time has not elapsed, the method 1000 may return to 1020 to determine whether the specified period of time has elapsed or not.

Figure 11:
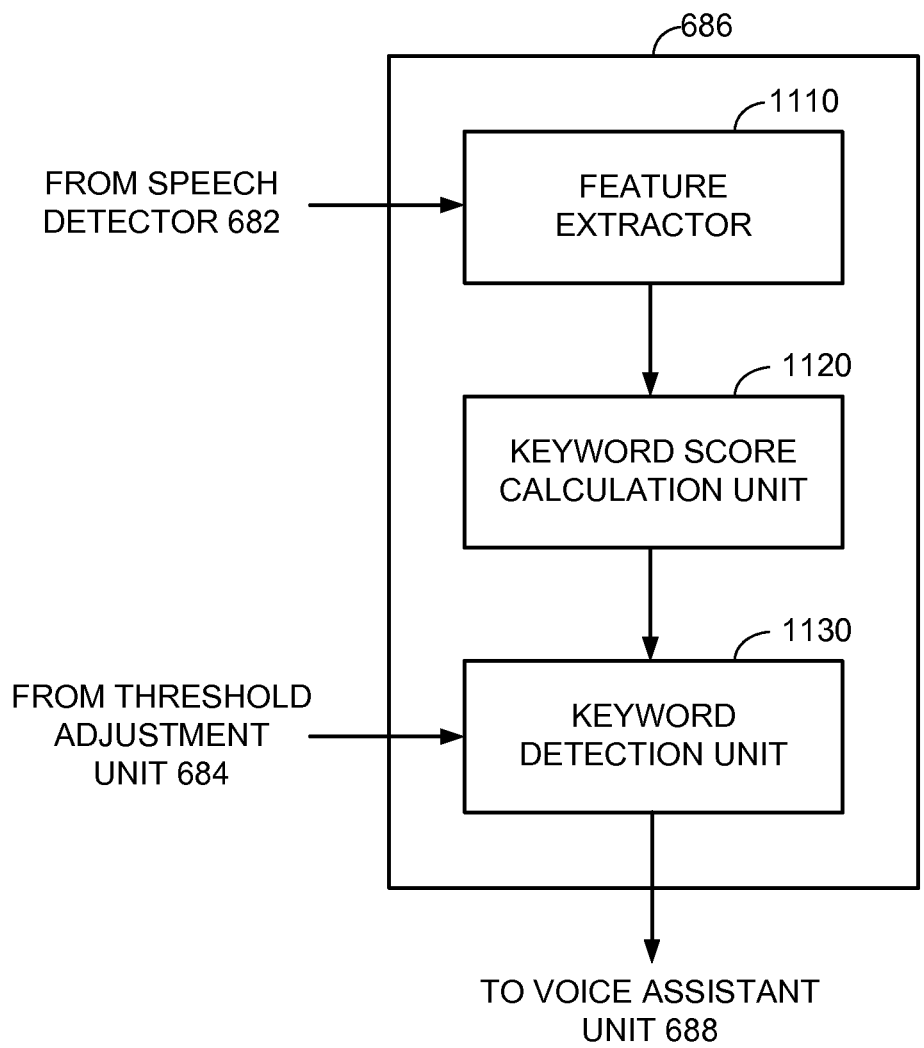
FIG. 11 illustrates a block diagram of a voice activation unit in a mobile device configured to activate a voice assistant function by detecting a target keyword in an input sound stream based on an adjusted detection threshold, according to one embodiment of the present disclosure.

FIG. 11 illustrates a block diagram of the voice activation unit 686 configured to activate the voice assistant unit 688 by detecting the target keyword in an input sound stream based on the adjusted detection threshold, according to one embodiment of the present disclosure. The voice activation unit 686 may include a feature extractor 1110, a keyword score calculation unit 1120, and a keyword detection unit 1130. When the keyword detection unit 1130 in the voice activation unit 686 detects the target keyword from the input sound stream, it generates an activation signal to turn on the voice assistant unit 688.

When the speech detector 682 determines an input sound stream to be human speech, the feature extractor 1110 receives the input sound stream and extracts one or more sound features from the input sound stream. In some embodiments, the feature extractor 1110 segments the input sound stream into a plurality of sequential frames of an equal time period. For example, the input sound stream may be received and sequentially segmented into frames of 10 ms. In this case, the feature extractor 1110 extracts a sound feature from each of the frames. In one embodiment, the feature extractor 1110 may extract the sound features from the frames using any suitable feature extraction method such as the MFCC (Mel-frequency cepstral coefficients) method. For example, in the case of the MFCC method, components of an n-dimensional vector are calculated from each of the segmented frames and the vector is used as a sound feature.

The extracted sound features are provided from the feature extractor 1110 to the keyword score calculation unit 1120. Upon receiving each sound feature, the keyword score calculation unit 1120 determines a keyword score for the sound feature. The keyword score may be determined in the manner as described above with reference to FIG. 6. The determined keyword score is provided to the keyword detection unit 1130.

The keyword detection unit 1130 receives the keyword score from the keyword score calculation unit 1120. The keyword detection unit 1130 also receives the adjusted detection threshold from the threshold adjustment unit 684. The received keyword score is then compared with the adjusted detection threshold. When the keyword score exceeds the adjusted threshold score, the keyword detection unit 1130 generates the activation signal to turn on the voice assistant unit 688. Otherwise, the keyword detection unit 1130 does not activate the voice assistant unit 688. In this case, the keyword detection unit 1130 may receive a subsequent keyword score, which is determined by the keyword score calculation unit 1120 for a next extracted sound feature, and determine whether the subsequent keyword score exceeds the adjusted detection threshold.

Figure 12:
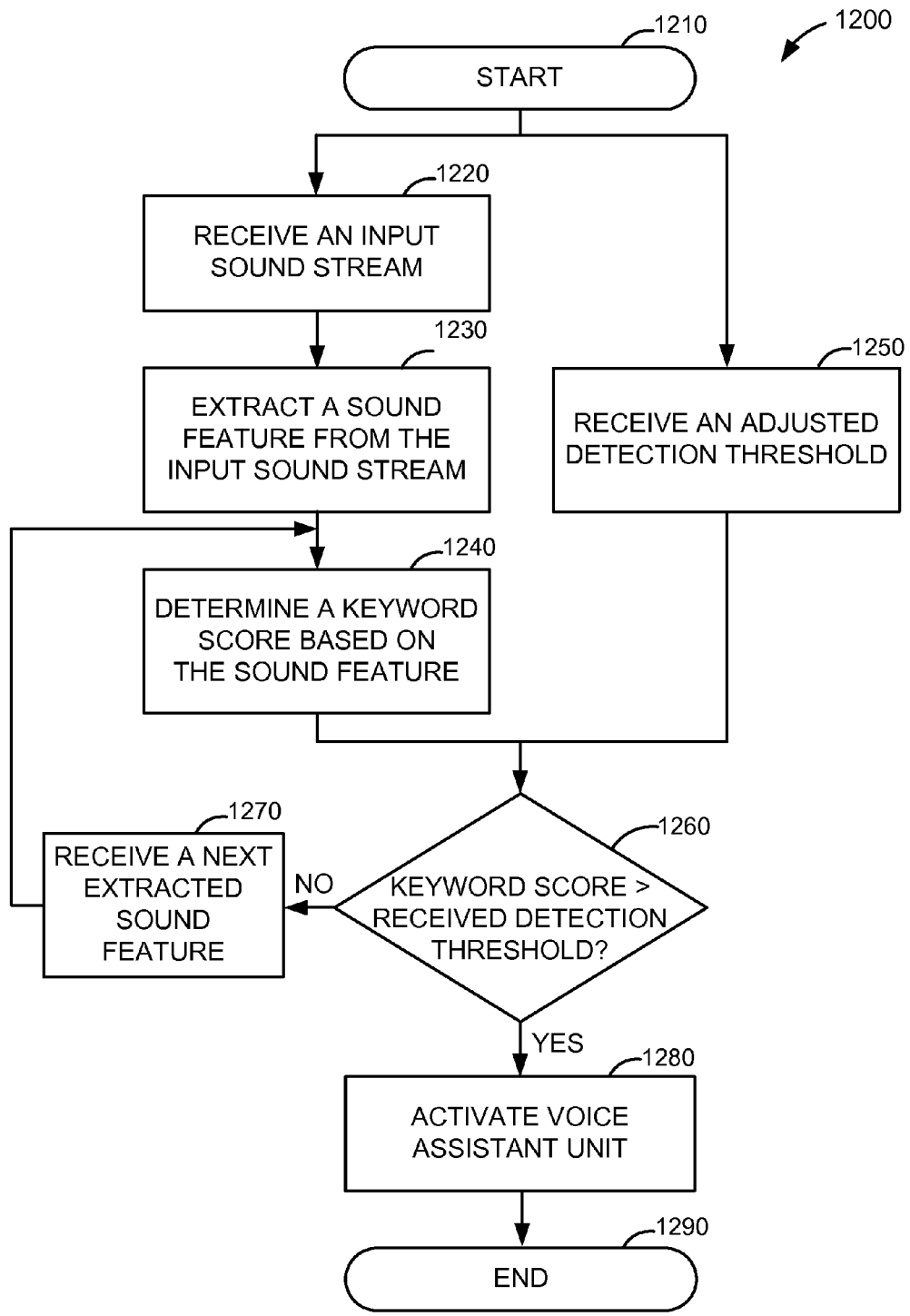
FIG. 12 is a flowchart of a method, performed in a mobile device, for activating a voice assistant function by detecting a target keyword in an input sound stream based on an adjusted detection threshold, according to one embodiment of the present disclosure.

FIG. 12 is a flowchart of a method 1200, performed in the voice activation unit 686, for activating the voice assistant unit 688 by detecting a target keyword in an input sound stream based on an adjusted detection threshold, according to one embodiment of the present disclosure. The method 1200 starts at 1210 and proceeds to 1220 where the feature extractor 1110 in the voice activation unit 686 receives the input sound stream from the speech detector 682. The feature extractor 1110 may extract a sound feature from the input sound stream, at 1230. The extracted sound feature is provided to the keyword score calculation unit 1120 in the voice activation unit 686.

In one embodiment, the input sound stream is sequentially segmented into a plurality of frames, from which a plurality of sound features is extracted. In this case, the plurality of sound features is sequentially provided to the keyword score calculation unit 1120. Upon receiving each sound feature from the feature extractor 1110, the keyword score calculation unit 1120 may determine a keyword score for the sound feature, at 1240. As described above with reference to FIG. 6, the keyword score may be determined using any suitable speech recognition technology such as a Markov chain model.

In the illustrated method 1200, the keyword detection unit 1130 receives the adjusted detection threshold from the threshold adjustment unit 684, at 1250. In one embodiment, the adjusted detection threshold may be received at 1250, while the input sound stream is received at 1220, the sound feature is extracted at 1230, or the keyword score is determined at 1240. In another embodiment, the keyword detection unit 1130 may receive the adjusted detection threshold before the feature extractor 1110 receives the input sound stream at 1220 or after the keyword score calculation unit 1120 determines the keyword score at 1240.

The keyword detection unit 1130 may determine, at 1260, whether the keyword score exceeds the received detection threshold. If the keyword score is determined not to exceed the detection threshold at 1260, the method may proceed to 1270 to receive a next sound feature extracted by the feature extractor 1110 and determine a keyword score for the next sound feature at 1240. On the other hand, if the keyword score is determined to exceed the detection threshold at 1260, the keyword detection unit 1130 may generate and transmit an activation signal to turn on the voice assistant unit 688, at 1280. The method may then terminate at 1290.

Figure 13:
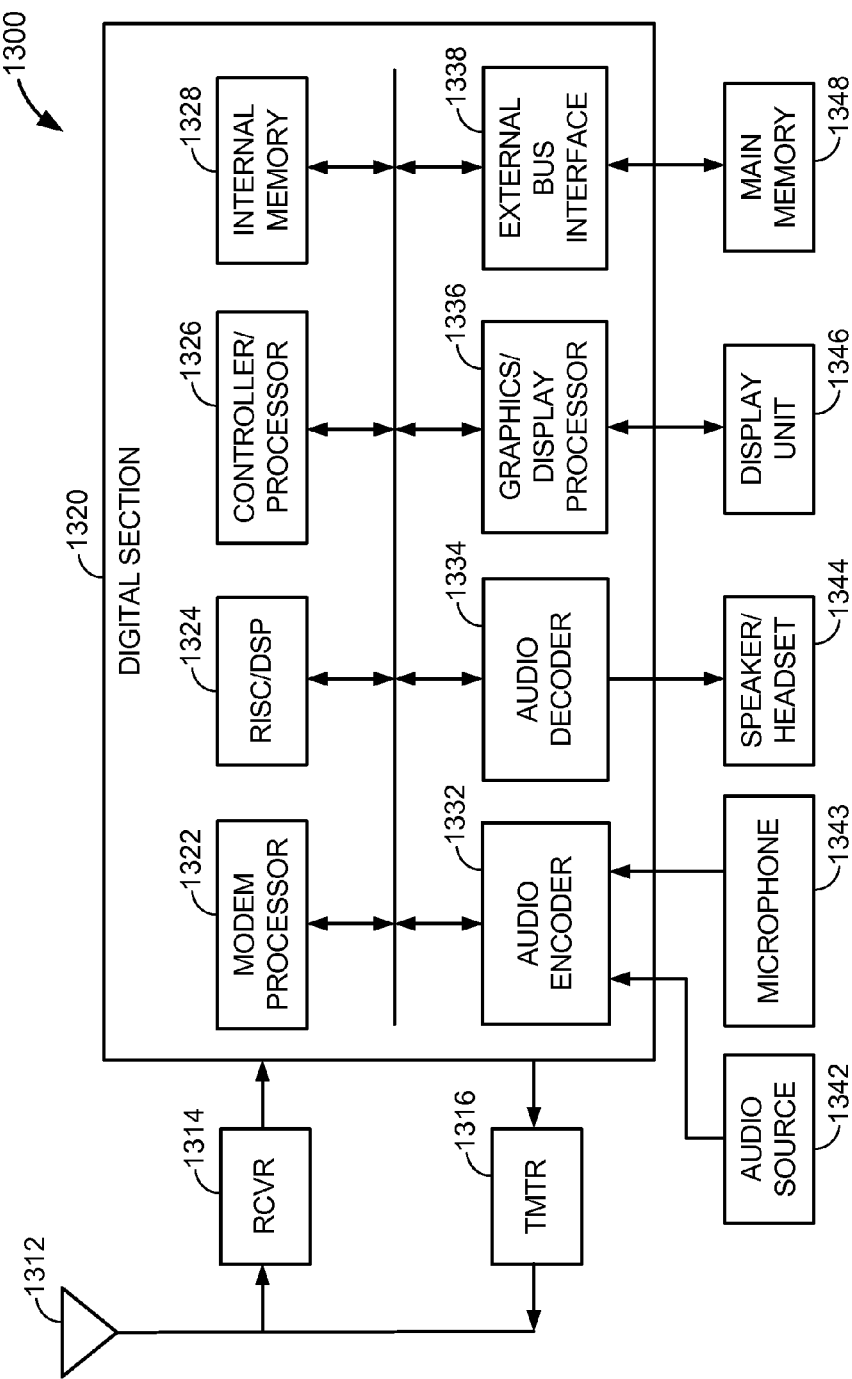
FIG. 13 illustrates a block diagram of a mobile device in a wireless communication system in which the methods and apparatus for detecting a target keyword in an input sound stream based on a detection threshold which is adjusted according to a context of the mobile device, according to one embodiment of the present disclosure.

FIG. 13 illustrates a block diagram of a mobile device 1300 in a wireless communication system in which the methods and apparatus for detecting a target keyword in an input sound stream based on a detection threshold which is adjusted according to a context of the mobile device 1300, according to one embodiment of the present disclosure. The mobile device 1300 may be a cellular phone, a terminal, a handset, a personal digital assistant (PDA), a wireless modem, a cordless phone, and so on. The wireless communication system may be a Code Division Multiple Access (CDMA) system, a Global System for Mobile Communications (GSM) system, a Wideband CDMA (W-CDMA) system, a Long Term Evolution (LTE) system, a LTE Advanced system, and so on.

The mobile device 1300 may be capable of providing bidirectional communication via a receive path and a transmit path. On the receive path, signals transmitted by base stations are received by an antenna 1312 and are provided to a receiver (RCVR) 1314. The receiver 1314 conditions and digitizes the received signal and provides the conditioned and digitized signal to a digital section 1320 for further processing. On the transmit path, a transmitter (TMTR) receives data to be transmitted from a digital section 1320, processes and conditions the data, and generates a modulated signal, which is transmitted via the antenna 1312 to the base stations. The receiver 1314 and the transmitter 1316 are part of a transceiver that supports CDMA, GSM, W-CDMA, LTE, LTE Advanced, and so on.

The digital section 1320 includes various processing, interface, and memory units such as, for example, a modem processor 1322, a reduced instruction set computer/digital signal processor (RISC/DSP) 1324, a controller/processor 1326, an internal memory 1328, a generalized audio encoder 1332, a generalized audio decoder 1334, a graphics/display processor 1336, and/or an external bus interface (EBI) 1338. The modem processor 1322 performs processing for data transmission and reception, e.g., encoding, modulation, demodulation, and decoding. The RISC/DSP 1324 performs general and specialized processing for the wireless device 1300. The controller/processor 1326 controls the operation of various processing and interface units within the digital section 1320. The internal memory 1328 stores data and/or instructions for various units within the digital section 1320.

The generalized audio encoder 1332 performs encoding for input signals from an audio source 1342, a microphone 1343, and so on. The generalized audio decoder 1334 performs decoding for coded audio data and provides output signals to a speaker/headset 1344. It should be noted that the generalized audio encoder 1332 and the generalized audio decoder 1334 are not necessarily required for interface with the audio source, the microphone 1343, and the speaker/headset 1344, and thus are not shown in the mobile device 1300. The graphics/display processor 1336 performs processing for graphics, videos, images, and text, which is presented to a display unit 1346. The EBI 1338 facilitates the transfer of data between the digital section 1320 and a main memory 1348.

The digital section 1320 is implemented with one or more processors, DSPs, microprocessors, RISCs, etc. The digital section 1320 is also fabricated on one or more application specific integrated circuits (ASICs) and/or some other type of integrated circuits (ICs).

In general, any device described herein is indicative of various types of devices, such as a wireless phone, a cellular phone, a laptop computer, a wireless multimedia device, a wireless communication personal computer (PC) card, a PDA, an external or internal modem, a device that communicates through a wireless channel, and so on. A device may have various names, such as an access terminal (AT), access unit, subscriber unit, mobile station, client device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein are implemented by various means. For example, these techniques are implemented in hardware, firmware, software, or combinations thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For hardware implementation, the processing units used to perform the techniques are implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for activating a voice assistant function in a mobile device, the method comprising:
   receiving an input sound stream by a sound sensor;
   determining a context of the mobile device based on the input sound stream;
   adjusting a threshold for activating the voice assistant function based on the context;
   detecting a target keyword from the input sound stream based on the adjusted threshold; and
   activating the voice assistant function in response to detecting the target keyword.

2. The method of claim 1, wherein determining the context of the mobile device comprises:
   obtaining data indicative of the context of the mobile device from at least one of an acceleration sensor, a location sensor, an illumination sensor, a proximity sensor, a clock unit, or a calendar unit in the mobile device; and
   identifying the context of the mobile device based on the input sound stream and the data.

3. The method of claim 1, wherein determining the context of the mobile device comprises:
   obtaining data indicative of the context of the mobile device from at least one of an acceleration sensor or a location sensor in the mobile device; and
   identifying the context of the mobile device as being in a vehicle based on the input sound stream and the data.

4. The method of claim 1, wherein determining the context of the mobile device comprises:
   obtaining data indicative of the context of the mobile device from at least one of an illumination sensor or a proximity sensor in the mobile device; and
   identifying the context of the mobile device as being within a container based on the input sound stream and the data.

5. The method of claim 1, wherein determining the context of the mobile device comprises:
   obtaining status information of the mobile device; and
   identifying the context of the mobile device based on the input sound stream and the status information.

6. The method of claim 5, wherein the status information indicates a change in an operational status of a processor in the mobile device from an idle state to an active state.

7. The method of claim 6, wherein the operational status of the processor changes from the idle state to the active state in response to receiving an electronic message.

8. The method of claim 6, wherein the operational status of the processor changes from the idle state to the active state in response to an alarm event in the mobile device.

9. The method of claim 1, further comprising setting the threshold to a predetermined threshold when a predetermined period of time elapses after adjusting the threshold.

10. The method of claim 1, wherein adjusting the threshold comprises adjusting the threshold based on a likelihood of using the voice assistant function in the context of the mobile device.

11. The method of claim 10, wherein the likelihood is high when the context indicates that the mobile device is in a vehicle.

12. The method of claim 10, wherein the likelihood is low when the context is indicative of a sleeping context.

13. The method of claim 1, wherein detecting the target keyword from the input sound stream comprises:
  calculating a degree of similarity between the input sound stream and a sound model of the target keyword;
  comparing the degree of similarity with the threshold; and
  detecting the target keyword from the input sound stream in response to the degree of similarity exceeding the threshold.

14. The method of claim 1, wherein determining the context of the mobile device further comprises identifying the context of the mobile device based on a change in an operational status of a processor of the mobile device.

15. A mobile device for activating a voice assistant function, comprising:
  a sound sensor configured to receive an input sound stream;
  a threshold adjustment unit configured to identify a context of the mobile device based on the input sound stream and to adjust a threshold for activating the voice assistant function based on the context of the mobile device; and
  a voice activation unit configured to activate the voice assistant function in response to detecting a target keyword from the input sound stream based on the adjusted threshold.

16. The mobile device of claim 15, wherein the threshold adjustment unit further comprises a context determination unit configured to obtain data indicative of the context of the mobile device from at least one of an acceleration sensor, a location sensor, an illumination sensor, a proximity sensor, a clock unit, or a calendar unit, and to identify the context of the mobile device based on the input sound stream and the data.

17. The mobile device of claim 15, wherein the threshold adjustment unit further comprises a context determination unit configured to obtain data indicative of the context of the mobile device from at least one of an acceleration sensor or a location sensor in the mobile device, and to identify the context of the mobile device as being in a vehicle based on the input sound stream and the data.

18. The mobile device of claim 15, wherein the threshold adjustment unit further comprises a context determination unit configured to obtain data indicative of the context of the mobile device from at least one of an illumination sensor or a proximity sensor in the mobile device, and to identify the context of the mobile device as being within a container based on the input sound stream and the data.

19. The mobile device of claim 15, wherein the threshold adjustment unit further comprises a context determination unit configured to obtain status information of the mobile device and to identify the context of the mobile device based on the input sound stream and on the status information.

20. The mobile device of claim 19, wherein the status information indicates a change in an operational status of a processor in the mobile device from an idle state to an active state.

21. The mobile device of claim 20, wherein the operational status of the processor changes from the idle state to the active state in response to receiving an electronic message.

22. The mobile device of claim 20, wherein the operational status of the processor changes from the idle state to the active state in response to an alarm event in the mobile device.

23. The mobile device of claim 15, wherein the threshold adjustment unit is further configured to set the threshold to a predetermined threshold when a predetermined period of time elapses after adjusting the threshold.

24. The mobile device of claim 15, wherein the threshold adjustment unit is further configured to adjust the threshold based on a likelihood of using the voice assistant function in the context of the mobile device.

25. The mobile device of claim 24, wherein the likelihood is high when the context indicates that the mobile device is in a vehicle.

26. The mobile device of claim 24, wherein the likelihood is low when the context is indicative of a sleeping context.

27. The mobile device of claim 15, wherein the voice activation unit is further configured to calculate a degree of similarity between the input sound stream and a sound model of the target keyword, to compare the degree of similarity with the threshold, and to detect the target keyword from the input sound stream in response to the degree of similarity exceeding the threshold.

28. The mobile device of claim 15, wherein the threshold adjustment unit further comprises a context determination unit configured to identify the context of the mobile device based on a change in an operational status of a processor of the mobile device.

29. A mobile device for activating a voice assistant function, comprising:
  means for receiving an input sound stream;
  means for adjusting a threshold for activating the voice assistant function by identifying a context of the mobile device based on the input sound stream and adjusting the threshold based on the context of the mobile device; and
  means for activating the voice assistant function in response to detecting a target keyword from the input sound stream and based on the adjusted threshold.

30. The mobile device of claim 29, wherein the means for adjusting the threshold further comprises means for obtaining data indicative of the context of the mobile device from at least one of an acceleration sensor, a location sensor, an illumination sensor, a proximity sensor, a clock unit, or a calendar unit in the mobile device, and for identifying the context of the mobile device based on the input sound stream and the data.

31. The mobile device of claim 29, wherein the means for adjusting the threshold further comprises means for obtaining data indicative of the context of the mobile device from at least one of an acceleration sensor or a location sensor in the mobile device, and for identifying the context of the mobile device as being in a vehicle based on the input sound stream and the data.

32. The mobile device of claim 29, wherein the means for adjusting the threshold further comprises means for obtaining status information of the mobile device and for identifying the context of the mobile device based on the input sound stream and the status information.

33. The mobile device of claim 32, wherein the status information indicates a change in an operational status of a processor in the mobile device from an idle state to an active state.

34. The mobile device of claim 33, wherein the operational status of the processor changes from the idle state to the active state in response to receiving an electronic message.

35. The mobile device of claim 33, wherein the operational status of the processor changes from the idle state to the active state in response to an alarm event in the mobile device.

36. The mobile device of claim 29, wherein the means for adjusting the threshold is configured to set the threshold to a predetermined threshold when a predetermined period of time elapses after adjusting the threshold.

37. The mobile device of claim 29, wherein the means for adjusting the threshold is configured to adjust the threshold based on a likelihood of using the voice assistant function in the context of the mobile device.

38. The mobile device of claim 37, wherein the likelihood is high when the context indicates that the mobile device is in a vehicle.

39. The mobile device of claim 29, wherein the context of the mobile device is detected based on further comprises based on a change in an operational status of a processor of the mobile device.

40. A non-transitory computer-readable storage medium comprising instructions for activating a voice assistant function in a mobile device, the instructions causing a processor of the mobile device to perform operations of:
 receiving an input sound stream by a sound sensor;
 determining a context of the mobile device based on the input sound stream;
 adjusting a threshold for activating the voice assistant function based on the context;
 detecting a target keyword from the input sound stream based on the adjusted threshold; and
 activating the voice assistant function in response to detecting the target keyword.

41. The medium of claim 40, wherein determining the context of the mobile device comprises:
 obtaining data indicative of the context of the mobile device from at least one of an acceleration sensor, a location sensor, an illumination sensor, a proximity sensor, a clock unit, or a calendar unit in the mobile device; and
 identifying the context of the mobile device based on the input sound stream and the data.

42. The medium of claim 40, wherein determining the context of the mobile device comprises:
 obtaining data indicative of the context of the mobile device from at least one of an acceleration sensor or a location sensor in the mobile device; and
 identifying the context of the mobile device as being in a vehicle based on the input sound stream and the data.

43. The medium of claim 40, wherein determining the context of the mobile device comprises:
 obtaining status information of the mobile device; and
 identifying the context of the mobile device based on the input sound stream and the status information.

44. The medium of claim 43, wherein the status information indicates a change in an operational status of the processor of the mobile device from an idle state to an active state.

45. The medium of claim 44, wherein the operational status of the processor changes from the idle state to the active state in response to receiving an electronic message.

46. The medium of claim 44, wherein the operational status of the processor changes from the idle state to the active state in response to an alarm event in the mobile device.

47. The medium of claim 40, wherein the operations further comprise setting the threshold to a predetermined threshold when a predetermined period of time elapses after adjusting the threshold.

48. The medium of claim 40, wherein adjusting the threshold comprises adjusting the threshold based on a likelihood of using the voice assistant function in the context of the mobile device.

49. The medium of claim 48, wherein the likelihood is high when the context indicates that the mobile device is in a vehicle.

50. The medium of claim 40, wherein determining the context of the mobile device further comprises identifying the context of the mobile device based on a change in an operational status of a processor of the mobile device.

* * * * *